United States Patent
Florencio et al.

(10) Patent No.: US 8,199,186 B2
(45) Date of Patent: Jun. 12, 2012

(54) THREE-DIMENSIONAL (3D) IMAGING BASED ON MOTIONPARALLAX

(75) Inventors: Dinei Afonso Ferreira Florencio, Redmond, WA (US); Cha Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 12/398,931

(22) Filed: Mar. 5, 2009

(65) Prior Publication Data
US 2010/0225743 A1 Sep. 9, 2010

(51) Int. Cl.
*H04N 13/00* (2006.01)
*H04N 13/04* (2006.01)

(52) U.S. Cl. .................. 348/51; 348/42; 348/44

(58) Field of Classification Search .......... 348/44, 348/51, 148; 359/32
See application file for complete search history.

(56) References Cited

U.S. PATENT DOCUMENTS

| | | |
|---|---|---|
| 5,287,437 A | 2/1994 | Deering |
| 5,467,104 A | 11/1995 | Furness, III et al. |
| 5,644,427 A | 7/1997 | Omori et al. |
| 5,712,732 A | 1/1998 | Street |
| 5,777,720 A | 7/1998 | Shapiro et al. |
| 6,014,164 A | 1/2000 | Woodgate et al. |
| 6,091,410 A | 7/2000 | Lection et al. |
| 6,163,336 A | 12/2000 | Richards |
| 6,211,848 B1 | 4/2001 | Plesniak et al. |
| 6,275,254 B1 | 8/2001 | Beeteson et al. |
| 6,326,994 B1 | 12/2001 | Yoshimatsu |
| 6,380,952 B1 | 4/2002 | Mass et al. |
| 6,392,689 B1 * | 5/2002 | Dolgoff ........................ 348/44 |
| 6,481,849 B2 | 11/2002 | Martin et al. |
| 6,496,598 B1 | 12/2002 | Harman |
| 6,578,962 B1 | 6/2003 | Amir et al. |
| 6,659,611 B2 | 12/2003 | Amir et al. |
| 6,676,259 B1 | 1/2004 | Trifilo |
| 6,714,665 B1 | 3/2004 | Hanna et al. |
| 6,750,904 B1 | 6/2004 | Lambert |
| 6,788,274 B2 | 9/2004 | Kakeya |
| 2004/0192430 A1 | 9/2004 | Burak et al. |
| 2006/0038881 A1 * | 2/2006 | Starkweather et al. ........ 348/51 |
| 2006/0139447 A1 * | 6/2006 | Unkrich ........................ 348/51 |
| 2010/0149610 A1 * | 6/2010 | Schwerdtner et al. ......... 359/32 |
| 2010/0194886 A1 * | 8/2010 | Asari et al. .................... 348/148 |

FOREIGN PATENT DOCUMENTS
WO WO2005009052 A1 1/2005

OTHER PUBLICATIONS

Duchowski, et al., "3D Eye Movement Analysis for VR Visual Ispection Training"; ACM 2002'; pp. 103-110.
Fehn, et al., "An Evolutionary and Optimised Approach on 3D-TV", retrieved on Jan. 5, 2009 at <<http://www.cs.unc.edu/~marc/pubs/FehnIBC02.pdf>>, 8 pages.

(Continued)

*Primary Examiner* — Quang N. Nguyen
(74) *Attorney, Agent, or Firm* — Lee & Hayes, PLLC

(57) ABSTRACT

Techniques and technologies are described herein for motion parallax three-dimensional (3D) imaging. Such techniques and technologies do not require special glasses, virtual reality helmets, or other user-attachable devices. More particularly, some of the described motion parallax 3D imaging techniques and technologies generate sequential images, including motion parallax depictions of various scenes derived from clues in views obtained of or created for the displayed scene.

19 Claims, 15 Drawing Sheets

OTHER PUBLICATIONS

Harrison, et al., "Pseudo-3D Video Conferencing with a Generic Webcam", IEEE Computer Society, 2008.

Honda, et al., "Second version of 3-D display system by Fan-like Array of Projeciton Optics"; 2003 SPIE-IS&T vol. 5006; pp. 118-127.

Kitamura, et al., "Interactive Stereoscopic Display for Three or More Users"; International Conference on Computer Graphics and Interactive Techniques Aug. 2001 pp. 231-140.

Little et al., Multiperspective autostereoscopic display; SPIE vol. 2219 Cockpit Displays 1994; pp. 388-394.

Morimoto, et al., "Pupil detection and tracking using multiplelight sources"; 2000 Elsevier Science B.V. vol. 18 No. 4 pp. 331-335.

Ohno, et al., "A Free-head Simple Calibration Gaze Tracking System That Enables Gaze-Based Interaction" 2004 ACM; pp. 115-122.

Perlin, "An Autosteroscopic Display"; International Conference on Computer Graphics and Interactive Techniques 2000; pp. 319-326.

Son, et al., "A Desktop Autostereoscopic Display with Head-Tracking Capability", Proceedings of the SPIE—The International Society for Optical Engineering; 2001. pp. 160-164.

Suenaga, et al., "Poster: Image-Based 3D Display with Motion Parallax using Face Tracking", retrieved on Jan. 5, 2009 at <<http://ieeexplore.ieee.org/stamp/stamp.jsp?arnumber=04476617>>, IEEE Symposium on 3D User Interfaces, Mar. 8-9, 2008, pp. 161-162.

Talmi, et al., "Eye and gaze tracking for visually controlled interactive stereoscopic displays"; 1999 Elsevier Science B. V.; vol. 14 No. 10 pp. 799-810.

Toyama, "Head Parallax Tracking for Control of a Virtual Space: a Comparison of Algorithms", retrieved on Jan. 5, 2009 at <<http://ieeexplore.ieee.org/stamp/stamp.jsp?arnumber=00816434>>, IEEE, 1999, pp. VI-1 to VI-6.

U.S. Appl. No. 10/922,769, entitled Stereoscopic Image Display, filed Aug. 19, 2004, by Starkweather et al.

* cited by examiner

Background

Background

Background

Background

THREE-DIMENSIONAL (3D) IMAGING BASED ON MOTIONPARALLAX

BACKGROUND

Human perception of three-dimensional (3D) vision relies up various clues in the images obtained by the eyes (more precisely, the retinas) of the human viewer. The terms "stereopsis" (or binocular parallax) and "motion parallax" refer to two categories of these clues. More particularly, binocular parallax refers to those clues arising from the different images of the same scene obtained by each of the eyes of the human viewer. For instance, because the eyes are positioned a certain distance apart, the right eye obtains an image as seen from a position to the right of the left eye and vice versa. Optical regions in the human brain interpret the difference in these two images and derive a perception of three-dimensional vision there from.

Motion parallax refers to those clues arising from different images of the same scene obtained by one (or both) eyes of a viewer as that viewer's position relative to the scene changes. In other words, as the viewer moves relative to the scene, differing portions of the scene become visible to, or hidden from the viewer. More particularly, as the viewer moves relative to the scene, objects in the scene which are closer to the viewer appear to move farther than more distant objects. Indeed at times, closer objects will eclipse more distant objects as the viewer moves. At other times, distant objects will emerge from behind closer objects as the viewer moves.

A conventional 3D display system typically includes special glasses, a virtual reality helmet, or some other user attachable device. The user attachable device provides cues and feedback information corresponding to the relative positions of the viewer's eyes to track positional changes of the eyes. These display systems display images for binocular viewing based on the positional feedback from the user attachable device.

Existing teleconferencing systems, gaming systems, a virtual user interaction system, and other viewing systems utilized conventional display systems, such as those discussed previously, to partially provide a 3D depiction of video images. While such viewing provides somewhat realistic 3D interaction, many users would prefer to be unencumbered by the user attachable devices. Accordingly, users of such display systems may prefer a system that locates and tracks a user without a user attachable device. Moreover, the user attachable devices, tend to increase the complexity and cost of these systems beyond that which some users are willing to tolerate. Furthermore, when the depicted scene is a real-world scene (i.e., not computer generated), imprecision in the depth estimate may produce artifacts in the generated image.

SUMMARY

One or more embodiments disclosed herein provide 3D (three-dimensional) imaging systems, which do not require special glasses, virtual reality helmets, or other user-attachable devices. More particularly, one or more embodiments provide motion-parallax-3D-imaging systems which generate sequential images including motion parallax depictions of various scenes derived from clues in views obtained of or created for the displayed scene.

More specifically, techniques and technologies are described herein for motion parallax three-dimensional (3D) imaging. Such techniques and technologies do not require special glasses, virtual reality helmets, or other user-attachable devices. More particularly, some of the described motion parallax 3D imaging techniques and technologies generate sequential images, including parallax depictions of various scenes derived from clues in views obtained of or created for the displayed scene.

BRIEF DESCRIPTION OF THE DRAWINGS

The same numbers are used throughout the drawings to reference like features and components.

DETAILED DESCRIPTION

Figure 1A:
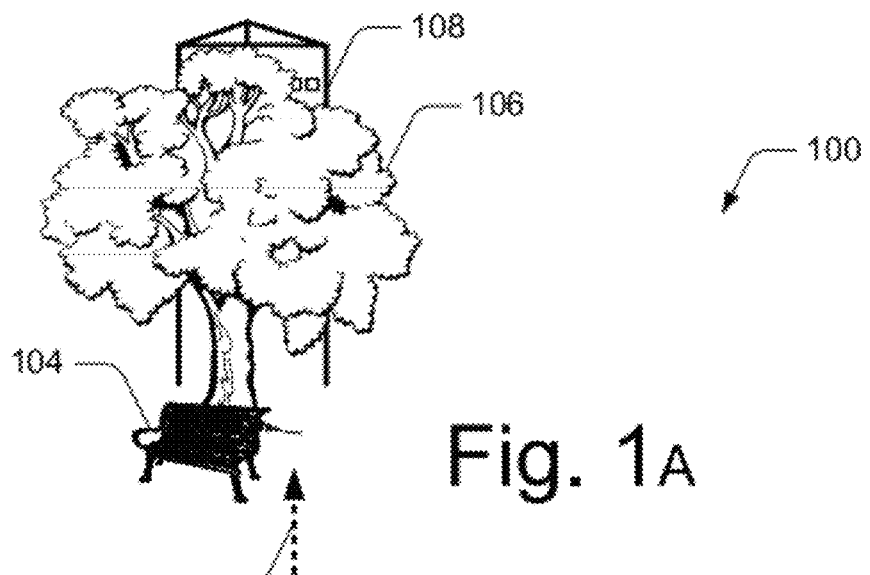
FIG. 1 illustrates a simulation of motion parallax for a 3D imaging system.

Techniques and technologies for three-dimensional (3D) imaging are disclosed herein. More particularly, the systems and methods described herein provide 3D imaging without the use of special glasses, virtual reality helmets, or other user attachable devices that are typically required for 3D displays. First, some aspects of, and differences between, motion parallax and binocular parallax are described. Binocular-3D-display systems are then briefly discussed. Next, various embodiments are disclosed which provide motion-parallax-3D-imaging systems and methods.

While aspects of the disclosed 3D imaging techniques and technologies can be implemented in any number of different computing systems, environments, and/or configurations, embodiments of 3D imaging systems are described in the context of, but not limited to, the system architectures disclosed herein.

At least one embodiment provides a motion-parallax-3D-imaging system including an image-acquisition system, a display system, a memory, and image-generation logic. The image-acquisition system determines the position of a viewer's eye (or pair of eyes) relative to the display system. The image-acquisition system also tracks the position of the viewer's eye. Moreover, a portion of the image-acquisition system can be separate from and movable relative to the display system. As mentioned previously, the overall system includes a display system which displays two-dimensional (2D) sequential images. In the current embodiment, the image-generation logic generates the sequential image including a motion parallax depiction of a scene. The image-generation logic bases the motion parallax depiction on information in a model of the scene and on the position of the viewer's eye relative to the display system. Such systems can be included in teleconferencing systems, gaming systems, virtual user interaction systems, etc.

Some models of the scene include a layer for each object in the scene. Each layer is associated with a depth corresponding to the position of the appropriate object within the scene. Some systems include a depth camera as a part of the image-acquisition system to obtain theses depths. Moreover, the model can include a framing layer (associated with the display system) which is used to frame the sequential image in the display system. The model is typically stored in the memory.

Some models of the scene may be a hybrid between computer generated imagery, and live (or recorded) imagery. More specifically, computer generated imagery can be used to complement a natural scene, in order, for example, to increase the sensation of depth, or to reduce the amount of artifacts in regions where depth estimation may be trick or imprecise. Finally, it can also be used to remove parts of the natural scene which are undesirable, for privacy or other reasons. Moreover, the models can be built before their use or can be built in real time as desired to support operation of the imaging system.

Furthermore, some systems include a device with which to calibrate the determination of the position of the viewer's eye relative to the display system. The calibration device can include a mirror which is viewed by the image-acquisition system. In these systems, the image-acquisition system determines the location of the calibration device (relative to the image-acquisition system) from the image of the calibration device which the image-acquisition system obtains. Additionally, the image-acquisition system determines the position of the display relative to the calibration device from, for instance, the position of a reflection of the display system in the mirror. If desired, the calibration device includes a patterned border positioned around the mirror to facilitate determining the position and orientation of the calibration device and the position of the display system.

Moreover, in some embodiments, the image-acquisition system predicts a positional change of the viewer's eye. In such systems, the motion parallax depiction of the scene is based on the predicted eye position rather than the last estimate of the eye position. In addition, or in the alternative, the position of the viewer's eyes is filtered to smooth the eye position as a function of time. In some systems, the image-acquisition system determines the difference between the positions of the eyes of the viewer. The sequential image displayed by these systems therefore includes a binocular parallax depiction of the scene based on the positional difference of the viewer's eyes.

In some systems, the image-acquisition can detect faces within its field of view. Depending on the number of faces detected by the image-acquisition system, these embodiments pause the generation of the sequential image; terminate the generation of the sequential image; issue a viewer alert; or take some other action.

Another embodiment provides a method of displaying sequential images which include motion parallax depictions of various scenes. The method includes various steps such as building a model of a scene and determining the location of a viewer's eye relative to a display system. From the model of the scene and the position of the viewer's eye, a motion parallax depiction of the scene is generated by image-generation logic. Additionally, the image-generation logic generates the sequential image (including the motion parallax depiction) and renders a two-dimensional version of the sequential image for display on the display system. Moreover, a tangible computer readable medium can be provided which has executable instructions which, when executed, cause the computer to perform the foregoing method.

Accordingly, embodiments disclosed herein provide motion parallax depictions on even 2D (two-dimensional) display devices and without requiring the use of user attachable devices. Accordingly, more realistic rendering of 3D images is provided. Moreover, embodiments of 3D imaging systems and methods disclosed herein are simpler, less expensive, and more reliable than those previously available. Embodiments also provide 3D imaging systems which are more flexible in their use than previously available 3D imaging systems. For instance, viewers can move through a volume of space in the vicinity of the display devices and yet still be able to perceive motion parallax 3D effects. For another example, the image-acquisition systems of various embodiments can be separate from, and movable relative to, the display devices. Yet another example of the improved flexibility of the embodiments disclosed herein includes the ability to provide 3D sequential images without necessarily having to generate, and display, a pair of binocular images with the attendant hardware, software, expense, etc. otherwise required.

Figure 1B:
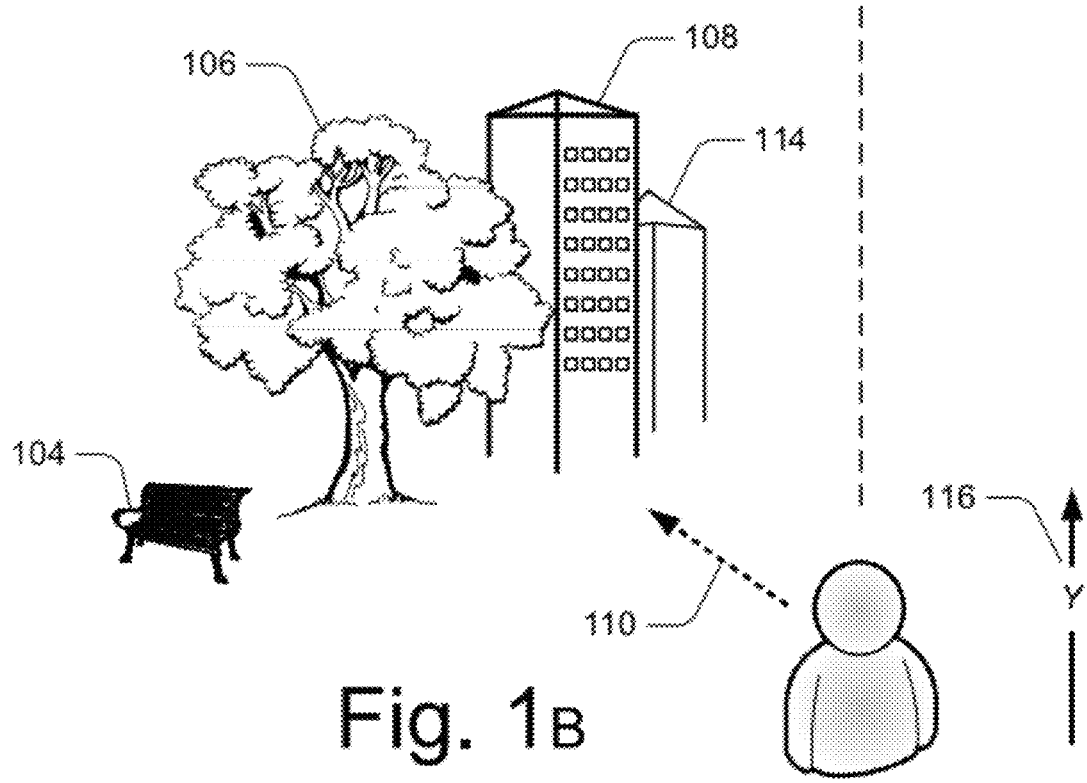
Figure 1C:
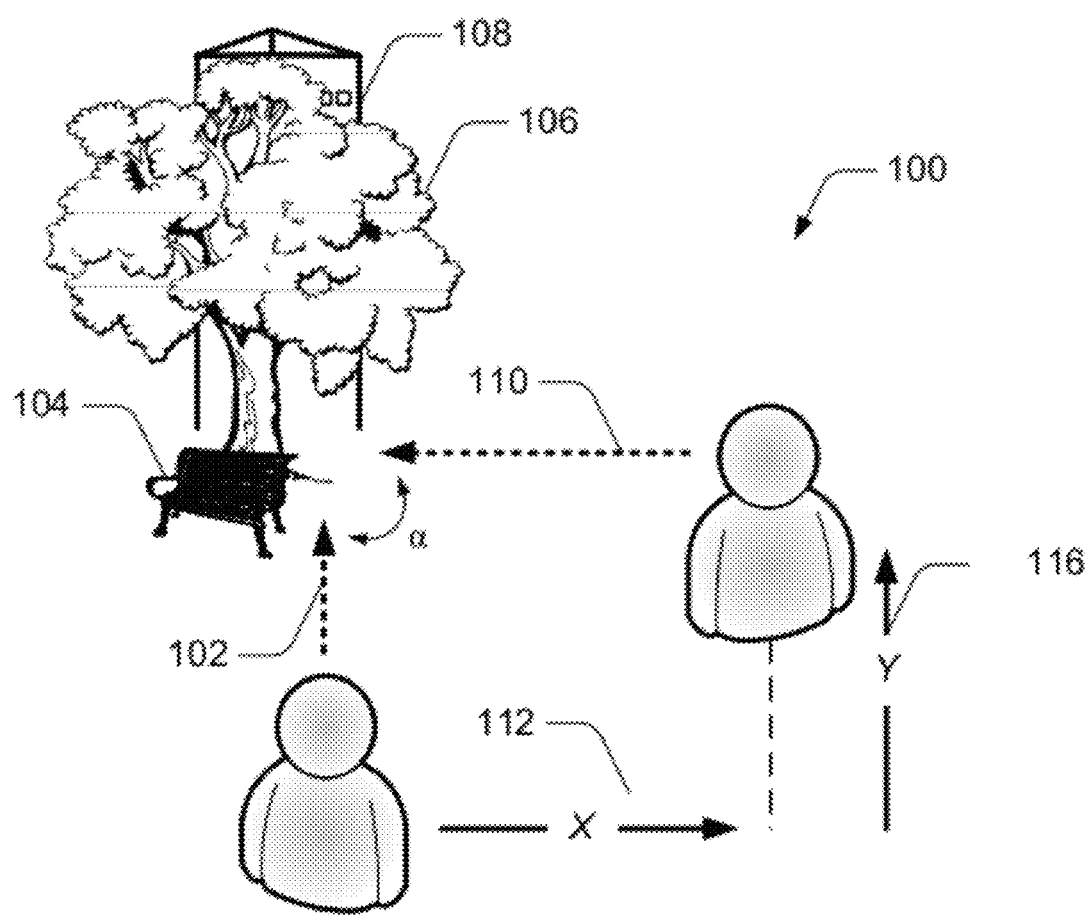

FIGS. 1A-C illustrate a simulation 100 of motion parallax as it relates to 3D imaging. Motion parallax is a perceptual characteristic that refers to how objects appear relative to each other and how they have different apparent positions based on the point of view of the viewer. For example, FIG. 1A illustrates a point of view 102 in which a park bench 104 sits under a tree 106 that mostly obscures a building 108. FIG. 1B illustrates a second point of view 110 as if the viewer had moved in a direction 112 over a distance X. During the move, it became evident that the park bench 104 is not under tree 106, but actually some distance away from the tree 106. Further, most of building 108 is no longer obscured by tree 106, and even another building 114 appears visible to the viewer from behind building 108.

A perception of depth can also be determined from motion parallax. For example, the park bench 104 appeared to be positioned under tree 106 in FIG. 1A when viewed from the point of view 102. However, the park bench 104 is actually positioned some distance away from the tree 106 as determined by the depth perception obtained when the viewer moved in direction 112 over the distance X and viewed the objects from the point of view 110.

Motion parallax provides depth perception because, in part, as a viewer moves, objects that are closer to the viewer move farther across the viewer's field of view than objects that are in the distance. For example, the park bench 104 is closer to the viewer, and therefore appears to have moved farther relative to the viewer than building 108 when the viewer moved in direction 112. In a similar example of motion parallax, the fence posts of a fence near a road appear to pass by quickly when traveling by car, whereas objects in the distance, such as trees, buildings, and the surrounding hills, appear to pass by slowly or stay in virtually the same apparent position.

Additionally, if the viewer moves in a direction 116 over a distance Y as shown in FIG. 1B, the viewer might be able to ascertain a more accurate perception of the distance from the park bench 104 to the tree 106, and from the tree 106 to the building 108. Moreover, combinations of viewer movements in directions 112 and direction 116 provide the viewer with rotational views of the objects. For example, the viewer may travel far enough in a diagonal direction between directions 112 and 116 to "rotate around" and view the building 108 from its other side.

FIG. 1C further illustrates motion parallax in that as the viewer moves relative to the objects in the scene, the viewer's previous and current positions (separated by distances X and Y) define an angle α relative to one or more objects in the scene. Additionally, the viewer may have moved closer to, or farther from, certain objects in the scene. Seeing the scene from the different angles of points of view 102 and 110, the viewer therefore perceives differing images. Thus, motion parallax relates to how a scene appears to a viewer based on the viewer's position relative to the scene.

However, on a smaller scale, similar affects can be observed between the point of view of one eye and the point of view of the other eye of a particular viewer. Of course, the magnitude of the differences between these images will correspond to the distance between the eyes (i.e., the intraocular distance). Thus, the difference in the images received by the two eyes will typically be relatively small compared to the difference between the images received by the viewer at two points of view 102 and 110 which are separated by an overall distance defined by distances X and Y. Of course, since the eyes of a viewer move together, some of the differences in the images received by the two eyes may be trivial or non existent. For instance, a fence as seen from a moving car will appear to move at essentially the same relative speed by both eyes. For another example, the angle α is typically so small that few, if any, objects are eclipsed as viewed by one eye, yet are visible to the other eye. Nevertheless, the images perceived by the two eyes of a viewer differ enough to give rise to binocular parallax.

Thus, binocular parallax-3D-display systems, in contrast to motion parallax-3D-imaging systems operate by presenting differing images to the two eyes of the viewer. One of these images corresponds to the viewpoint of one eye and the other image corresponds to the viewpoint of the other eye. Of course, care is taken in such binocular parallax systems to present the appropriate views to the corresponding eyes. That is, the image as seen from the viewpoint of the right eye is presented to the right eye and the image as seen from the viewpoint of the left eye is presented to the left eye. From there, the optic nerve of the viewer conveys the images as neurological impulses to the optical regions of the viewer's brain. Thus, the viewer views the two images, one through each eye, and perceives a binocular parallax depiction of the displayed scene.

However, it has been heretofore impractical to create images with motion parallax depiction, particularly on 2D display devices (e.g., CRT, LED, and gas plasma display devices). In part, this situation exists because motion parallax generally arises from points of view 102 and 110 which are on the order of several feet or more apart. In contrast, the intraocular distance giving rise to binocular parallax happens to be on the order of two inches or so. Nevertheless, some success has been met in efforts to create binocular-3D-display systems. For instance, co-owned U.S. patent application Ser. No. 10/922,769, entitled Stereoscopic Image Display, filed on Aug. 19, 2004, by Starkweather et al., describes various binocular parallax display systems and methods. Accordingly, it may be useful to briefly discuss some aspects of binocular-3D-display systems and methods before disclosing various embodiments of motion-parallax-3D-imaging systems and methods.

Figure 2:
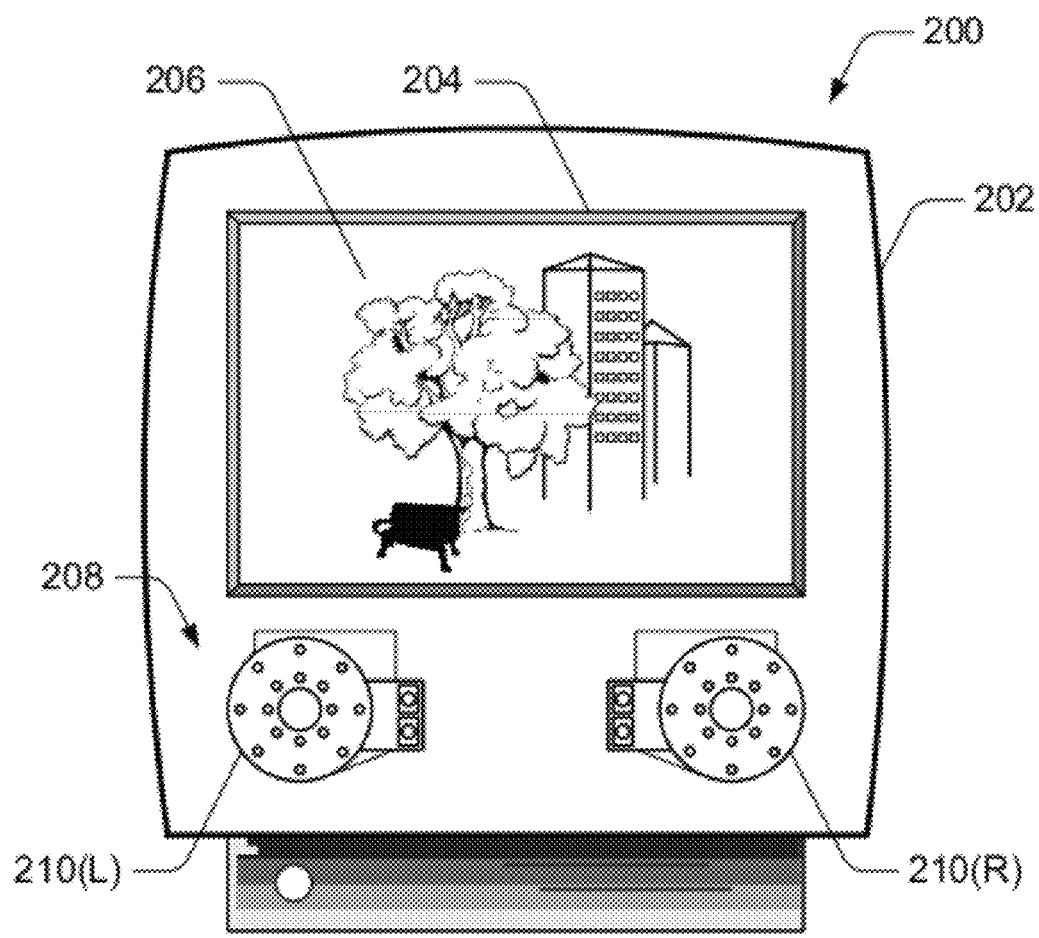
FIG. 2 illustrates various components of an embodiment of a binocular parallax display system.

FIG. 2 illustrates a binocular-3D-display system. More particularly, and with reference to FIG. 2, the '769 application describes binocular parallax display systems which include an eye-acquisition system, a display system, and image-generation logic. The eye-pupil-acquisition system 200 determines the location of the viewer's eye pupils thereby allowing the image-generation logic to generate the two differing images for the viewer's eyes. Binocular-3D-display system 200 includes display device 202 and various components 204 thereof for displaying an image 206 of a scene. The binocular-3D-display system 200 also includes an eye pupil acquisition system 208 which includes a pair of camera systems 210.

Figure 3:
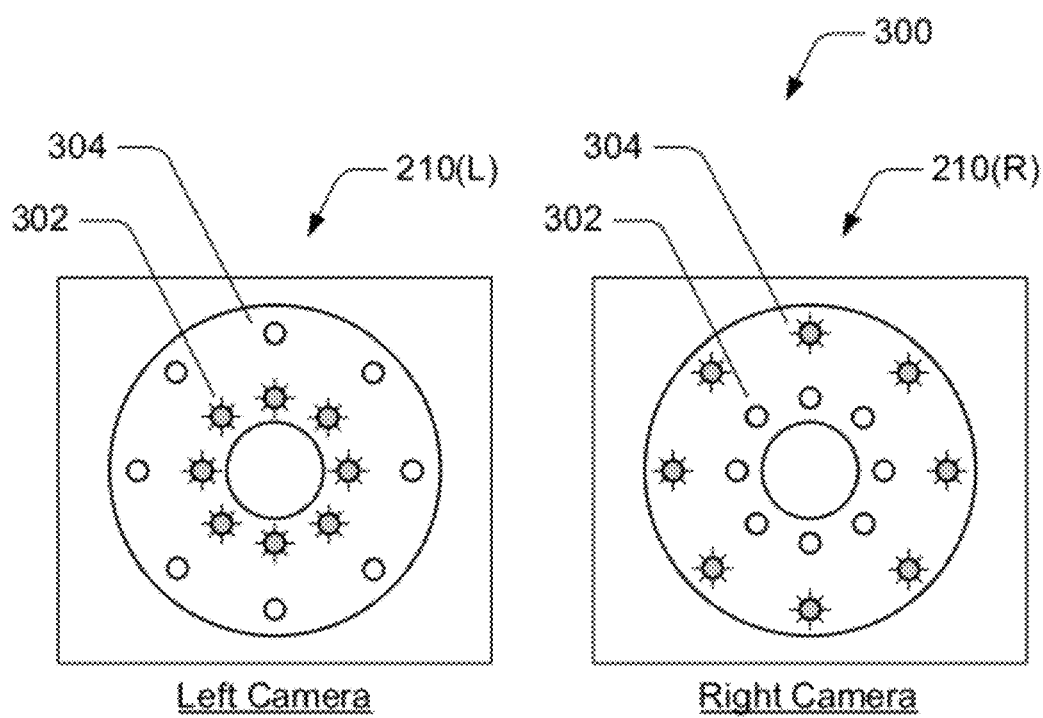
FIG. 3 further illustrates various components of the binocular parallax display system shown in FIG. 2.

FIG. 3 illustrates an eye-pupil-detection system 300 which corresponds to the eye-pupil-acquisition system 208 of FIG. 2. The eye-pupil-detection system 300 of each camera system 210 includes an on-axis illumination source 302 (e.g. infrared light emitting diodes or LEDs) and an off-axis illumination source 304. The two illumination sources can be operated to turn on and off in alternation such that when the on-axis illumination source 302 is on, any eyes present in the field of view of the camera system 210 (and aligned with the camera system 210) will retroreflect the light emitted from the on-axis illumination source 302. When the off-axis illumination source 304 is on, the appearance of the scene viewed by the camera system 210 will be quite similar to the appearance of the scene while the on-axis illumination source 302 was on, except that any eyes present in the scene will not retroreflect the light from the off-axis illumination source 304. The difference between the two images can be used to locate an eye which is generally aligned with the camera system 210. In the binocular parallax 3D display systems described by the '769 application, one of the camera systems 210R is generally aligned with the right eye of the user and the other camera system 210L is generally aligned with the left eye of the user. Thus, the camera systems 210 can locate and track both eye pupils of the user.

Figure 4:
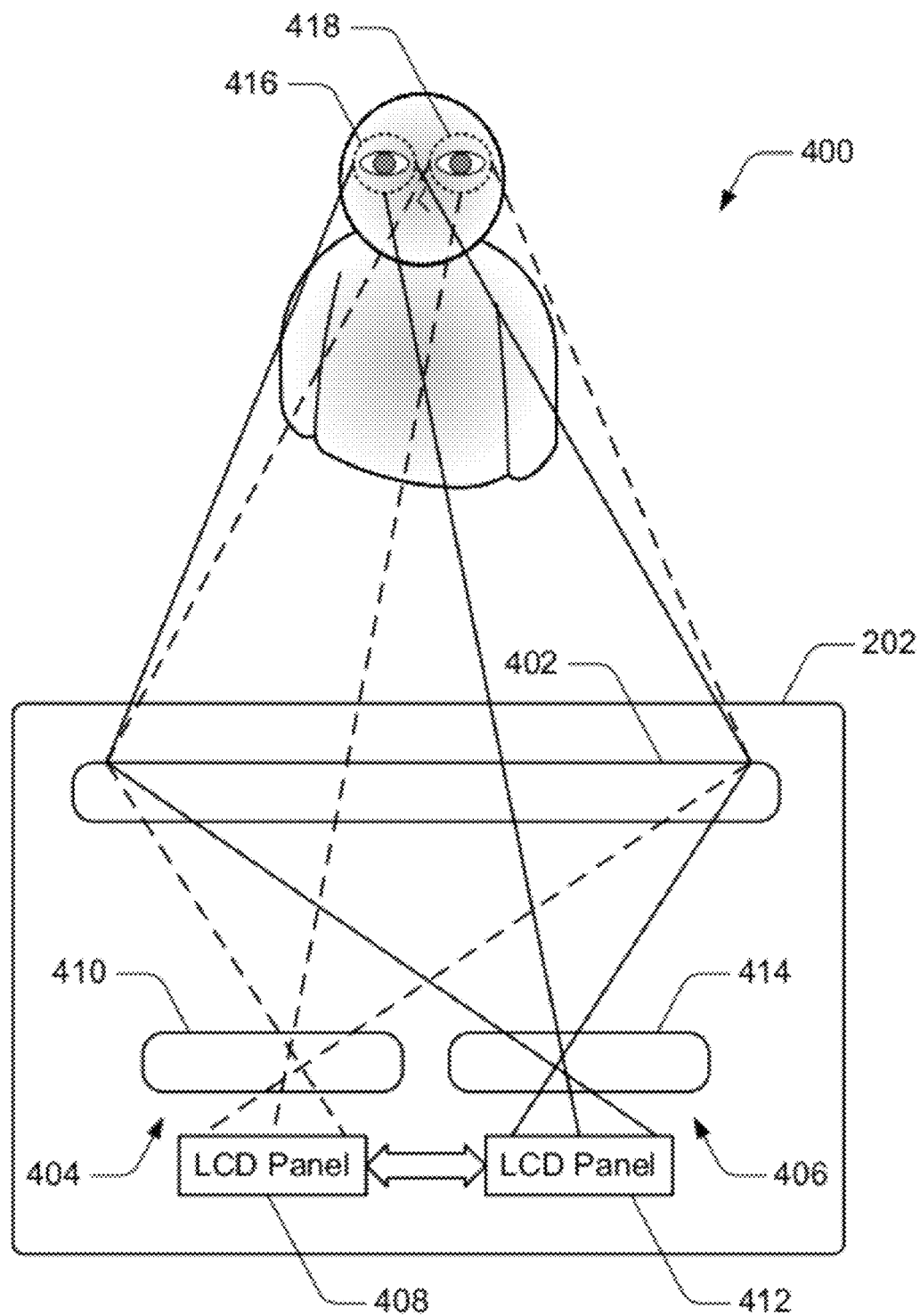
FIG. 4 illustrates an optical assembly of the binocular parallax display system shown in FIG. 2.

FIG. 4 further illustrates the binocular-3D-display device 202 of the binocular-3D-display system 200. More particularly, FIG. 4 illustrates a display lens 402, and two display systems 404 and 406, including, respectively, display devices 408 and 412, and projection lenses 410 and 414. Display system 406 is configured to project an image to the focus 416 for the right eye of the viewer while display system 406 is configured to project an image to the focus 418 for the left eye of the viewer. Indeed, the two images projected by display systems 404 and 406 can be generated in such a manner as to be a pair of binocular parallax images so that the viewer perceives a binocular parallax depiction of the scene which the sbinocular-3D-display system 200 of FIG. 2 is displaying for the viewer.

With regard to the various components of the binocular-3D-display device 202, the display lens 402 can be a Fresnel lens while the display devices 408 and 412 can be implemented as LCD display panels. Moreover, the aperture of the projection lenses 410 and 414 is such that the exit pupil images (i.e., focus 416 and focus 418) are somewhat larger than the entrance pupil of the eyes of the viewer. For example, for a 50 mm projection lens having f/1.2 optics, the lens exit pupil would be approximately 40 mm (i.e., 50 mm/1.2). Because a normally adapted human eye has an approximate 3 mm pupil diameter, the approximate 40 mm projection of focus 416 and focus 418 yields a viewing zone in which the viewer can view the image including a binocular parallax depiction without undue difficulty in head motion control. In this example, the viewer can be positioned approximately two feet from the display device 202 and can view an image much like viewing a traditional computer display.

Figure 5:
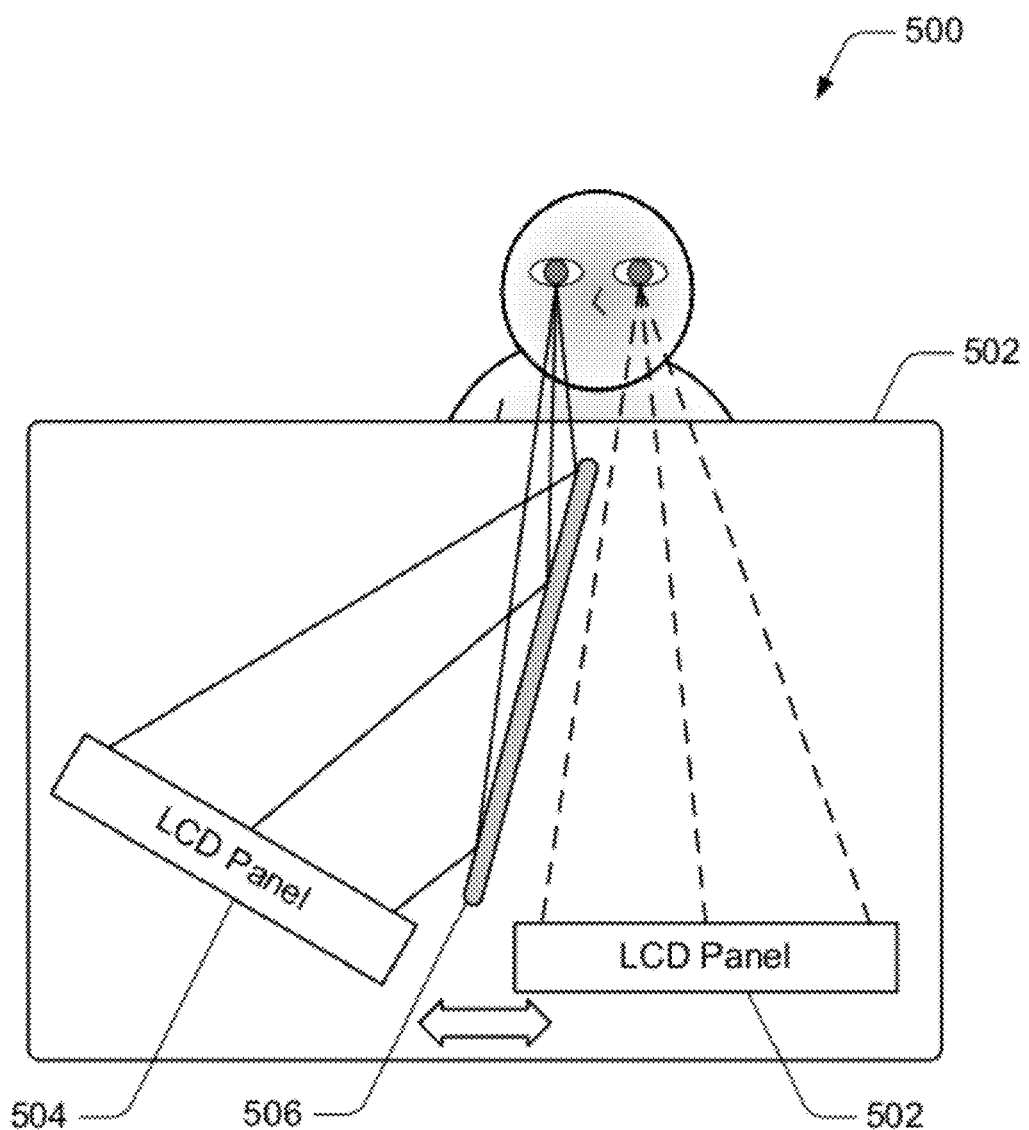
FIG. 5 illustrates various components of another embodiment of a binocular parallax display system.

FIG. 5 illustrates another binocular-3D-display device described in the '769 application. The binocular-3D-display device 500 can be configured using a pair of LCD displays 502 and 504 and a mirror 506. One LCD display 502 can be positioned for viewing by the left eye of the viewer and the other LCD display 504 and mirror 506 can be configured to reflect an image from LCD display 504 for viewing by the right eye of the viewer. In operation, the binocular parallax display device 500 can be used in conjunction with a pair of eye-pupil-detection systems 300 (of FIG. 3). In which case, the position and orientation of the components 502, 504, and 506 can be controlled to mechanically align the images with the detected positions of the user's eye pupils.

In the '769 application, the term "motion parallax depiction" is sometimes used to refer to the term "binocular depiction" as used herein. Moreover, in the '769 patent, the term "rotational depiction" is sometimes used to refer to the term "motion parallax depiction" as used herein. Having discussed some binocular-3D-display systems and methods, various embodiments of motion-parallax-3D-imaging systems and methods are now disclosed.

With reference to FIG. 6, various components of an embodiment of a motion-parallax-3D-imaging system 600 are illustrated. More particularly, FIG. 6 illustrates a display device 602, a display component 604, a sequential image 606, an image-acquisition system 608, and a camera system 610. The display component 604 can be a conventional LCD (liquid crystal display), CRT (cathode ray tube), LED (light emitting diode), gas plasma, etc. type of display component. More particularly, display component 604 can be a 2D display component which, when used as disclosed herein, displays motion parallax depictions of various scenes. In the alternative, display component 604 can be a binocular parallax display component such as, but not limited to, display components 402 and 502 discussed herein with reference to FIGS. 4 and 5, respectively.

Note that in the following discussion, at least two types of images are discussed. One type of image is acquired by the camera system 610 and is used, in part, to determine whether any eyes, faces, etc. are present near the motion-parallax-3D-imaging system 600. These types of images can also be used to determine the position of, and track, those eyes which might be present in the vicinity of the motion-parallax-3D-imaging system 600. The other type of images include sequential images 606 of various scenes which might be displayed. For instance, the viewer might desire to view scenes from a gaming system or a teleconferencing system on the display device 602. This latter type of sequential images 606 can therefore be artificially generated in various manners, or obtained by a camera(s) remote from (or near to) the display device 602.

Image-acquisition system 608 can be similar to eye pupil acquisition system 208 as illustrated in FIG. 2. Thus, image-acquisition system 608 is used to detect and track the eyes of various viewers. In addition, image-acquisition system 608 can be used to detect, and count, faces in the vicinity of display device 602. In some embodiments, though, image-acquisition system 608 is a single video camera system 610 with supporting logic which perform various machine vision functions including face detection, face counting, eye (or eye pupil) detection, eye tracking etc.

In operation, the motion-parallax-3D-imaging system 600 adjusts the sequential image 606 to include a motion parallax depiction based on the position of the viewer's eyes (or a single eye in some embodiments) relative to the display device 602. Thus, as the viewer moves relative to the display device 602, the motion-parallax-3D-imaging system 600 of FIG. 6 detects the viewer's movement and adjusts the sequential image 606 on display component 604 so that the user perceives a 3D motion parallax depiction within the sequential image 606.

Figure 6A:
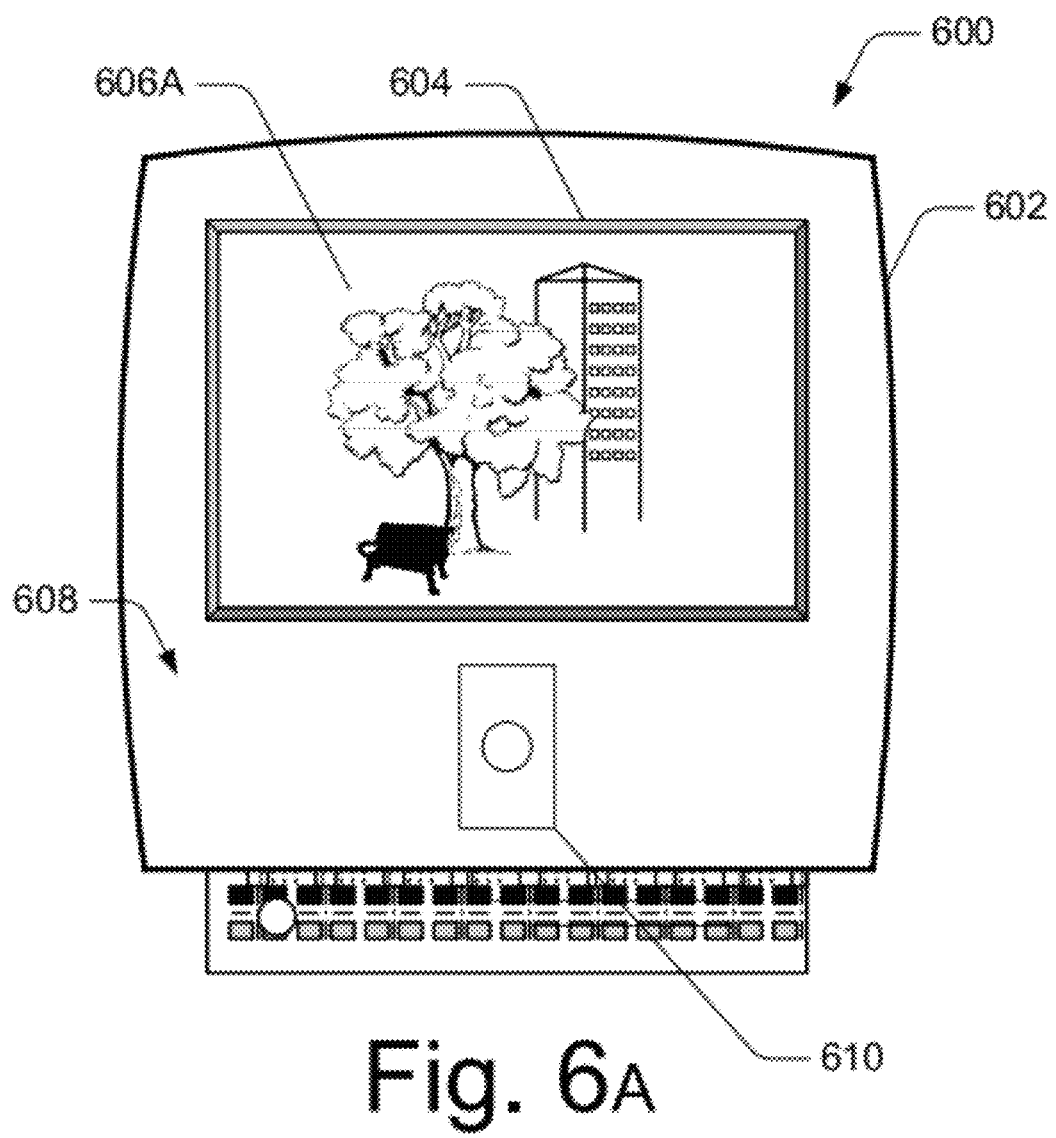
FIGS. 6A and 6B illustrate various components of an embodiment of a motion-parallax-3D-imaging system.
Figure 6B:
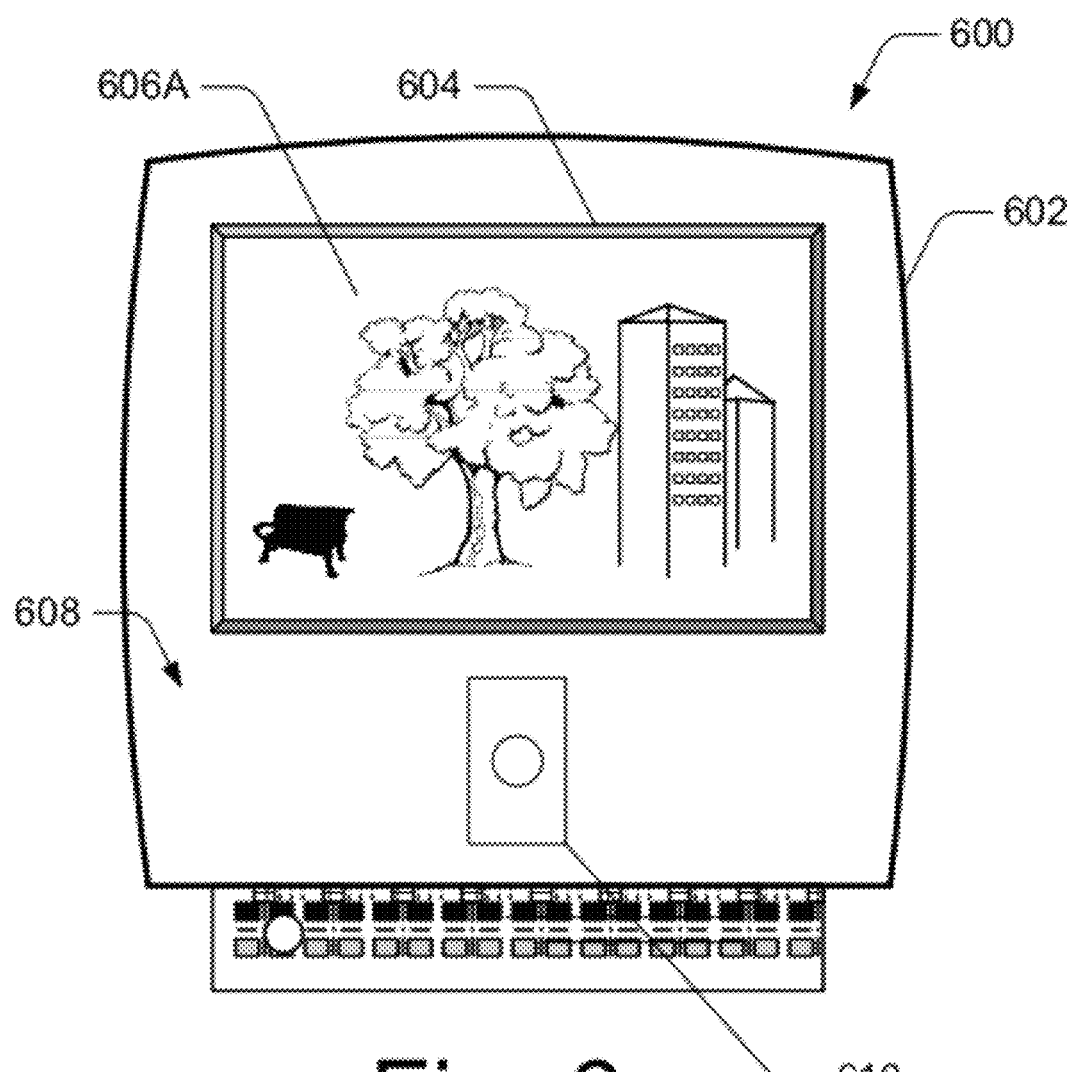

For instance, a comparison of FIGS. 6A and 6B illustrates that the sequential image 606 includes a motion parallax depiction. FIG. 6A illustrates one frame of sequential image 606 as viewed from point of view 102 (see FIG. 1A) while FIG. 6B illustrates another frame of sequential image 606 as viewed from point of view 110 (see FIG. 1B). Between these frames, the viewer has moved relative to display device 602. More particularly, the viewer has moved a distance proportional to distance X and Y through angle α (see FIGS. 1A-C) but relative to display device 602 rather than relative to the objects in the displayed scene. On a conventional display device (whether a "flat" screen display device or a binocular parallax display device), the movement of the viewer would have resulted in no motion parallax depiction within sequential image 606.

However, in the embodiment illustrated by FIG. 6, the viewer's movement (i.e., the movement of the viewer's eye) was detected by image-acquisition system 608. Accordingly, the motion-parallax-3D-imaging system 600 adjusted the next frame of the sequential image 606 to include a motion parallax depiction of the scene. For instance, whereas FIG. 6A illustrates the park bench 104 as appearing to be under the tree 106, FIG. 6B (with the motion parallax depiction relative to FIG. 6A) illustrates the park bench 104 as actually being some distance away from the tree 106. Thus, the motion-parallax-3D-imaging system 600 has rendered sequential image 606 with a motion parallax depiction.

With continuing reference to FIG. 6, another advantage of the current embodiment is that, if sequential image 606 is a natural image, then computer-generated elements may be added, with the particular objective of increasing, enhancing, or otherwise altering the motion parallax effect. This can be done by inserting elements at a different distance (e.g., closer), or by replacing segments of the scene which do not have reliable depth information or which the user desires to replace.

Figure 7:
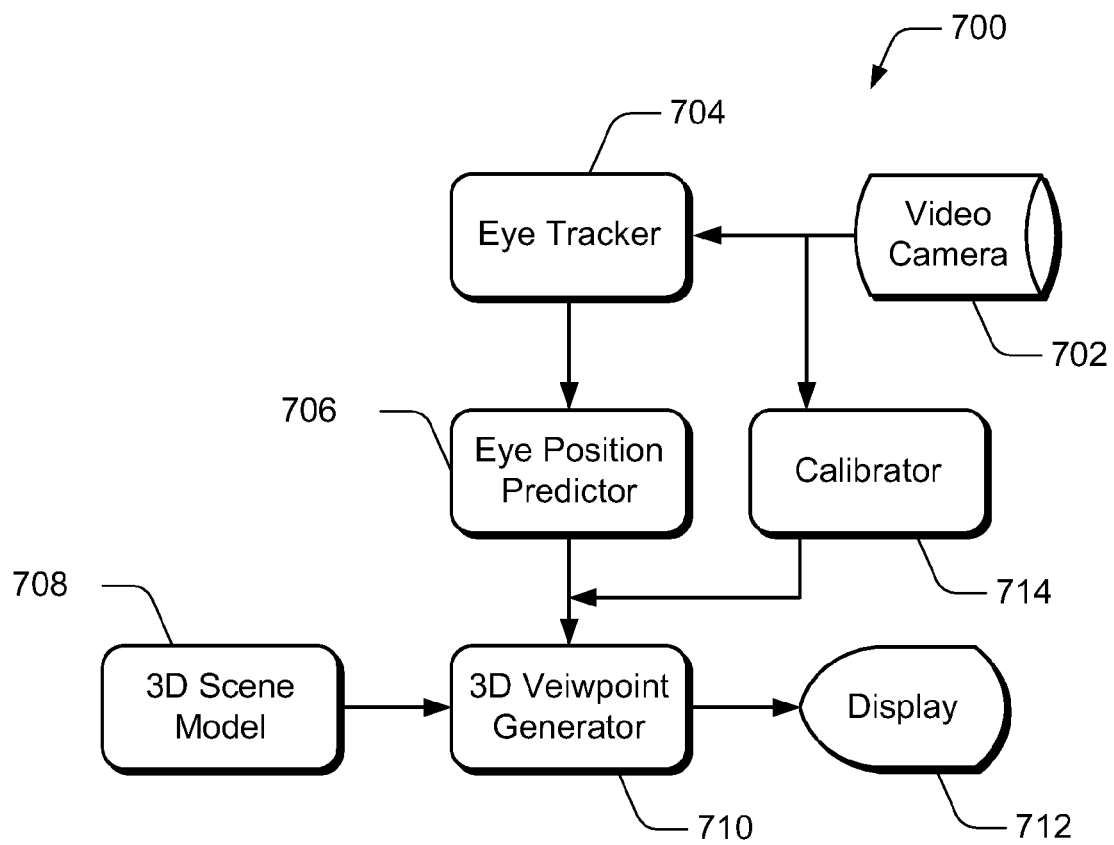
FIG. 7 is a schematic diagram illustrating various components of a computing device that can be implemented as a motion-parallax-3D-imaging system, such as the motion-parallax-3D-imaging system shown in FIG. 6.

With reference now to FIG. 7, a block diagram of a motion-parallax-3D-imaging system 700 is illustrated. Motion-parallax-3D-imaging system 700 includes an image-acquisition system including a video camera 702, an eye tracker (and face detector) 704, an eye position predictor 706, a 3D-scene model 708, a 3D viewpoint generator 710, a display 712, and a calibrator 714. In the motion-parallax -3D-imaging system 700, the video camera 702 sends signals conveying images of the vicinity of the display 712 to the eye tracker 704 and to the calibrator 714. The calibrator is discussed herein in further detail with reference to FIGS. 10-12.

The eye tracker 704 determines the location of, and tracks, the eye(s) of the viewer by analyzing the image signals it receives from the video camera 702. More particularly, the eye tracker 704 determines the position of the viewer's eye relative to the display 712 and tracks its movements relative to the display 712. The eye tracker 704 communicates the position of the viewer's eye to the eye position predictor 706.

The eye position predictor 706 analyzes the eye position signals it receives from the eye tracker 704 and determines the eye's velocity, acceleration, etc. From this information, eye position predictor 706 determines where the eye is likely to be during the next frame of sequential image 606 (see FIG.

6). Thus, the eye position predictor 706 accounts for any lag that might be present in the motion-parallax-3D-imaging system 700 of FIG. 7.

Furthermore, in motion-parallax-3D-imaging system 700, the 3D-scene model 708 contains information defining various scenes which the viewer may select for viewing. For instance, the 3D-scene model 708 can contain information defining a conference room, office, auditorium, etc. which the viewer might want to view during a teleconference with other teleconference participants at their particular location. The 3D-scene model 708 may be artificially created or can be derived (using machine vision techniques) from images taken of the scene by a camera or video camera positioned to image the scene. Thus, the model reflects the current state of the scene (and the objects therein) as will be discussed further with reference to FIG. 8.

The 3D viewpoint generator 710 receives the eye position signals from the eye position predictor 706 and obtains information from the 3D-scene model 708. The 3D viewpoint generator 710 can query the 3D-scene model when the eye position signal indicates that the viewer's eye has moved or, the 3D-scene model 708 can send updated information to the 3D viewpoint predictor 710 when the information in the 3D-scene model 708 changes. In the alternative, the information from the 3D-scene model 708 can be updated on a regular basis or according to some schedule. In some embodiments, various combinations of the foregoing techniques are used to maintain the information in the 3D viewpoint generator 710 regarding the scene to be displayed.

Regardless of how the information is maintained in a current state, the 3D viewpoint generator 710 determines how the scene would appear to a viewer who is actually at the scene and moved corresponding to the manner in which the viewer's eye has moved. In other words, if the viewer moves (or moves their eye) the 3D viewpoint generator 710 determines how the scene ought to appear based on the location of the viewer relative to the display 712. Thus, 3D viewpoint generator 710 renders a sequential image including a motion parallax depiction and displays the scene with the motion parallax depiction on display 712. Accordingly, when the viewer moves relative to the video camera 702, the sequential image 606 on display 712 changes to account for the movement of the viewer (at least in terms of motion parallax). For instance, if the viewer moves a distance proportional to X and Y (see FIGS. 1A-C) from point of view 102 to point of view 110, the sequential image on display 712 changes to show the appearance of the scene from point of view 110. Thus, the tree 106, the park bench 104, the buildings 108 and 110 etc. appear to be spread out as in FIG. 1B as opposed to their appearance in FIG. 1A.

Figure 8:
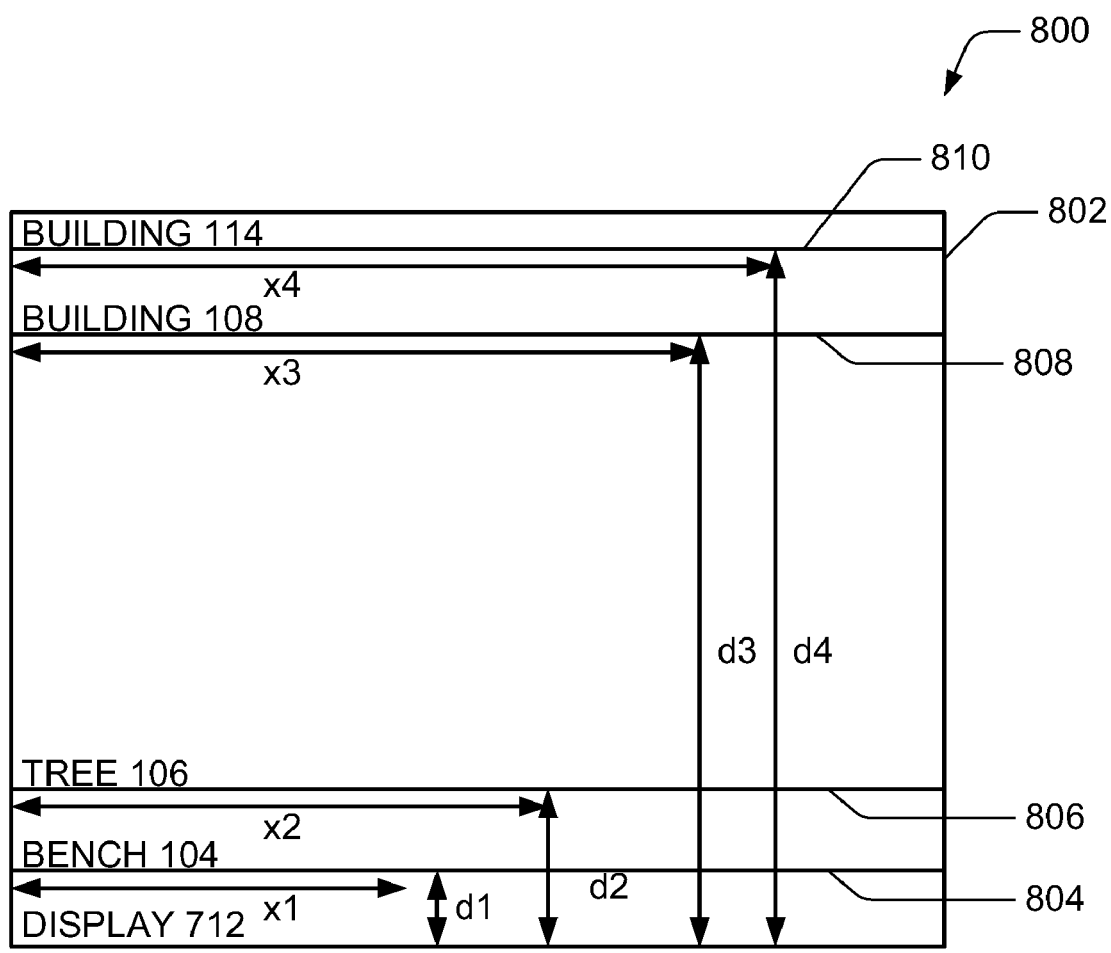
FIG. 8 illustrates a 3D-scene model for use with the computing device of FIG. 7.

FIG. 8 illustrates an embodiment of a 3D-scene model 800 which corresponds to the 3D-scene model 708 of FIG. 7. As discussed previously, the 3D-scene model 800 includes information regarding the scene to be displayed. More particularly, the 3D-scene model 800 contains information regarding the positions of objects within the scene. 3D-scene model 800 includes a frame layer 802 and various object layers 804, 806, 808, and 810 corresponding to objects in the scene to be displayed. For instance layer 804 corresponds to the park bench 104, layer 806 corresponds to the tree 108, layer 808 corresponds to the closer of the two buildings 108, and layer 810 corresponds to the other building 110. Each object layer 804, 806, 808, and 810 has associated there with a depth d1, d2, d3, and d4, respectively, which is the depth of the corresponding object from the camera which obtains the images of the scene. In cases where the scene is artificially created (e.g., in a gaming system) the creator of the scene defines the viewpoint which would correspond to that of the camera viewing the scene and sets the depths accordingly. The frame layer 802 can have a depth associated with it at some user selected value or it can default to some depth such as zero.

The 3D-scene model 800 also includes information regarding the various objects' positions relative to other axes. For instance, 3D-scene model 800 includes information regarding the lateral positions X1-4 of the various objects. Of course, the 3D-scene model 800 can also include information regarding the elevations, dimensions, etc. of the various objects in scene. Thus, in embodiments of motion motion-parallax-3D-imaging systems (in which the video camera 702 and eye tracker 704 can track the viewer's eye through vertical motions) the motion-parallax-3D-imaging systems can include vertical motion parallax depictions as well as horizontal motion parallax depictions (and combinations thereof) in their rendering of the scenes. More particularly, given the positions (d1, x1), (d2, x2), (d3, x3), and (d4, x4) of the various objects in the scene and the position (predicted or current) of the viewer's eye, motion-parallax -3D-imaging system 700 renders the scene as it would appear to a viewer were that viewer actually at the scene and in a position corresponding to the viewer's position relative to the video camera 702.

Figure 9:
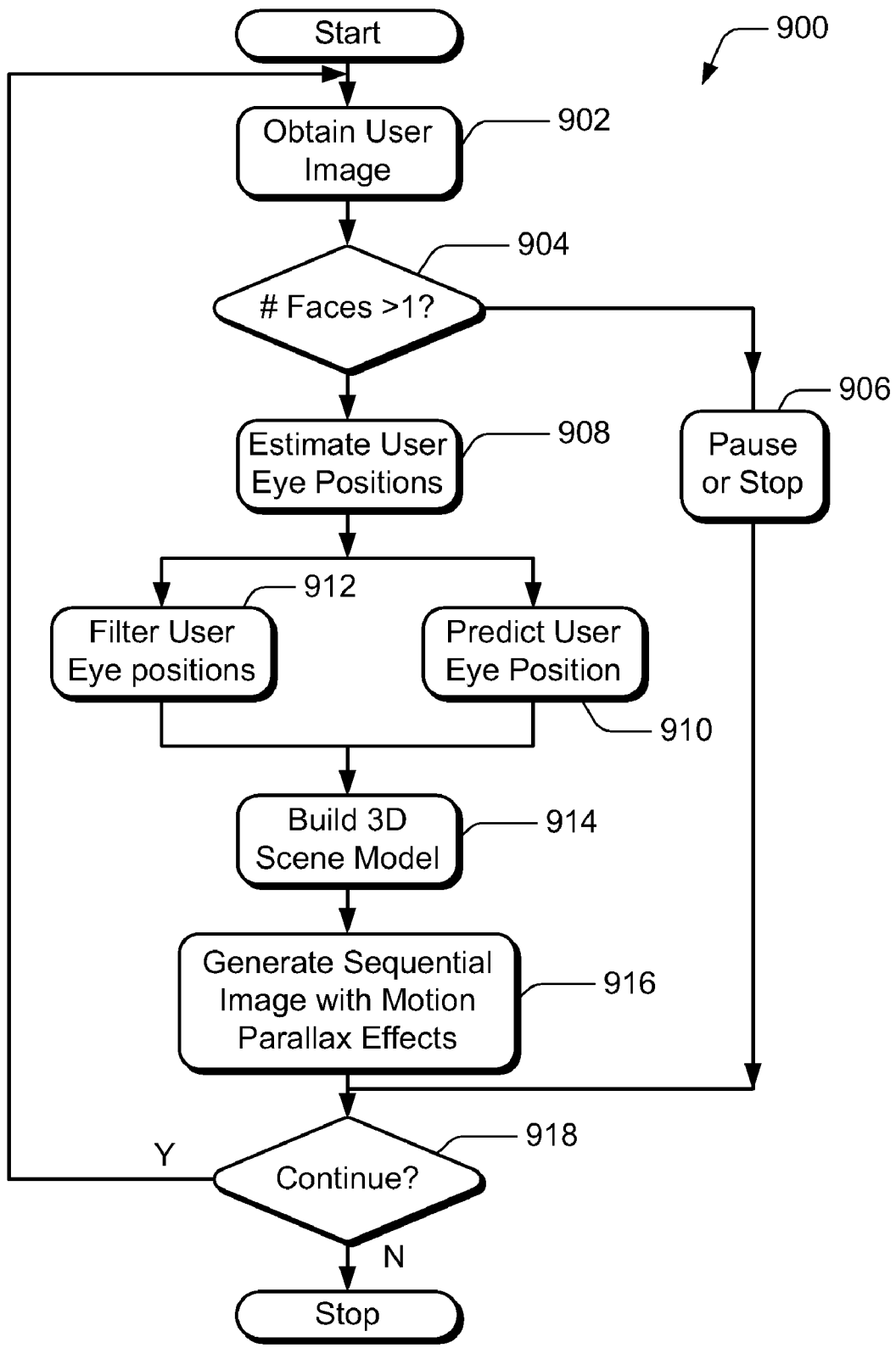
FIG. 9 is a flow diagram that illustrates a method associated with the motion-parallax-3D-imaging system shown in FIG. 6.

FIG. 9 is a flowchart illustrating one embodiment of a motion parallax 3D imaging method. The method 900 is typically practiced with a parallax-3D-imaging system such as the motion-parallax-3D-imaging systems 600 and 700 of FIGS. 6 and 7, respectively. The method can also, or in the alternative, be practiced with binocular parallax-3D-display systems such as binocular-3D-display systems 200, 400, and 500 of FIGS. 2, 4, and 5. However, for purposes of illustration, the method 900 will be discussed with reference to the motion-parallax-3D-imaging system 600 of FIG. 6.

With continuing reference to FIG. 9, the method 900 includes obtaining an image of a viewer in the vicinity of the display device 602 with the image-acquisition system 608. See step 902. Since it might be the case that more than one person is in the image during some times, the method 900 includes determining the number of faces in the obtained image. When the image-acquisition system 608 determines that more than one face is present in the image, the method 900 can include either pausing or stopping the rendering of the sequential image 606 on the display device 602. See step 904 and 906. In the alternative, the motion-parallax-3D-imaging system 600 can display a message to the viewer that the presence of more than one face in the image might cause the system to track the eye of a person other than the intended viewer. In another alternative, the image-acquisition system 608 can, when a new face is detected in the image, remain locked on the eye it was previously tracking, thereby ignoring the presence of the other potential viewer.

When only one face is present in the image, or when the motion-parallax -3D-imaging system 600 is configured to continue despite the presence of more than one face, the image-acquisition system 608 determines the position of at least one eye of the user. See step 908. Using previous eye positions, at step 910, the image-acquisition system 608 predicts where the eye of the viewer is likely to be during the rendering of the next frame of sequential image 606 (see FIG. 6). In some embodiments, the image-acquisition system 608 can apply a filter to smooth the eye position signal it receives before predicting the eye position. One advantage of doing so is that noise in the eye position signal can be eliminated thereby providing a smoother frame-to-frame rendering of the sequential image 606. See step 912.

At step 914 of method 900, the 3D-scene model 708 (see FIG. 7) is updated if already built, or built if not yet in existence. The method 900 also includes generating (and displaying) the sequential image 606 of a scene based on the viewer's position relative to the image-acquisition system 608 and based on the 3D-scene model 708. See step 916. Depending on the viewer's desire, at step 918, the method continues by generating another frame with updated information regarding the position of the viewer's eye and with updated information from the 3D-scene model 708. In the alternative, the method 900 ends when desired.

Moreover, in some situations, it might be desirable to establish (or calibrate) the relative positions of certain components of the motion-parallax-3D-imaging systems disclosed herein. For instance, on occasion, it may be desired to replace a video camera system 610 (see FIG. 6). In which case, the otherwise fixed geometry between the video camera system 610 and the display device 602 might be altered. As a result, the calculations involved in generating the sequential image 606 (and more particularly, the calculations involved in generating the motion parallax depiction) might be favorably modified to account for the new geometry between the video camera system 610 and the display device 602.

Figure 10:
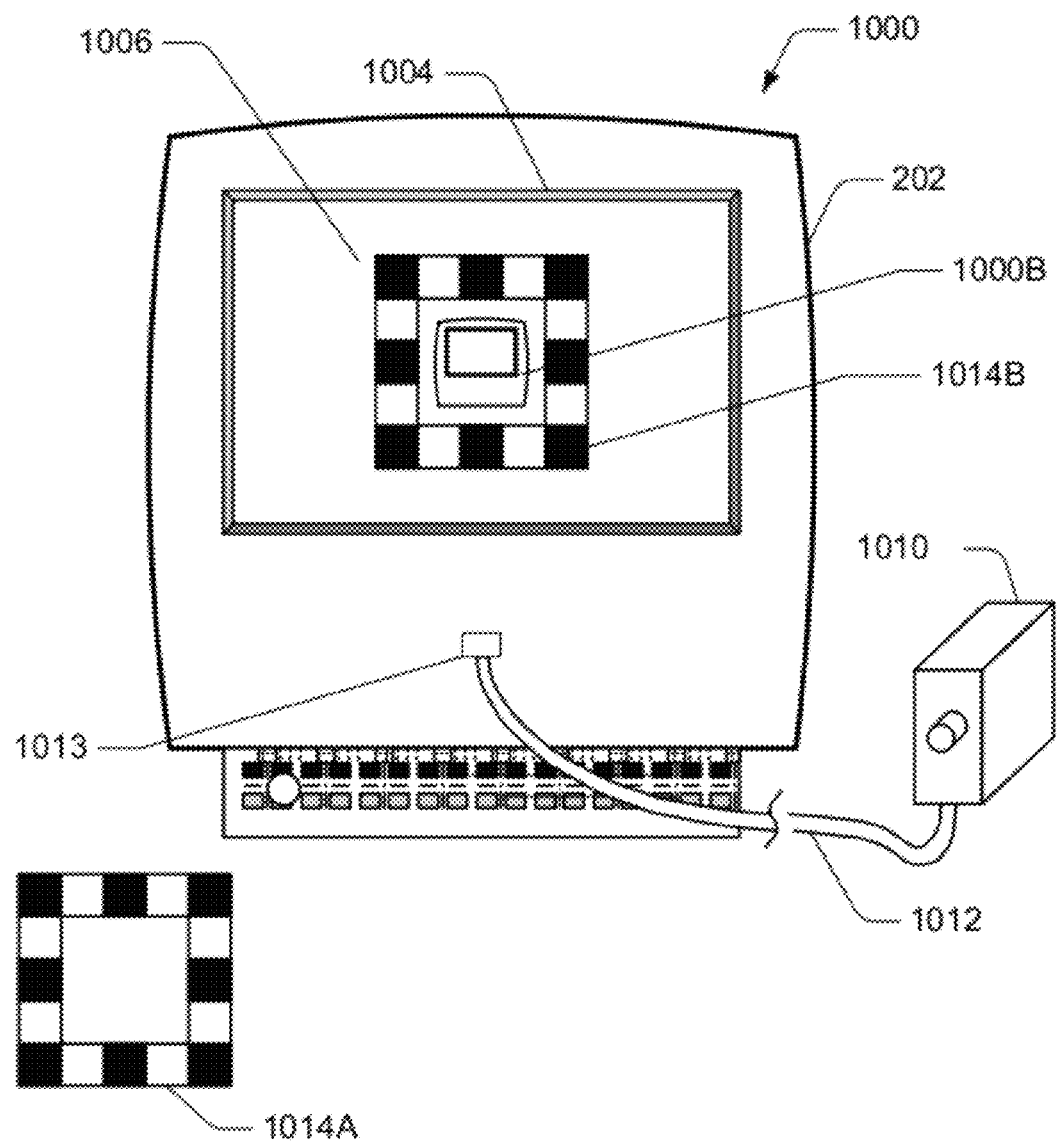
FIG. 10 illustrates various components of an embodiment of a calibration system for 3D imaging systems, such as the motion-parallax-3D-imaging system shown in FIG. 6.

Another situation which might call for modifying these calculations, and with reference to FIG. 10, is that in some embodiments the video camera 1010 is separate from, flexibly coupled to, or movable relative to, the display device 202. Accordingly, the geometry between the video camera 1010, the user, and the display device 202 can vary. Thus, one embodiment provides systems and methods for calibrating 3D imaging systems.

Figure 11:
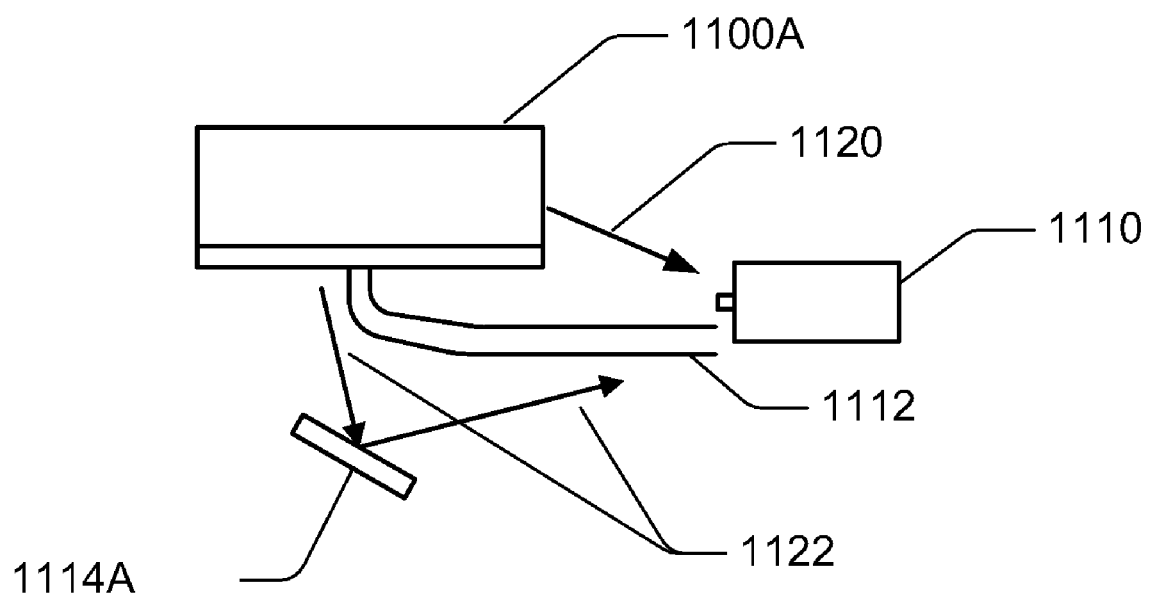
FIG. 11 illustrates various components of the calibration system for the motion-parallax-3D-imaging system shown in FIG. 10.

FIG. 10 illustrates one embodiment of a calibration system 1000 for various 3D imaging systems. More particularly, FIG. 10 illustrates that the video camera 1010 is movable relative to the display device 202 and communicates with the calibration system 1000 (which can be included in, or with, a 3D imaging system) via a cable 1012 and corresponding jack 1013 or other communications link (e.g. a wireless link). FIG. 10 also illustrates a calibration device 1014A, possibly containing a mirror, its image 1014B in display device 202, and the reflection 1000B of the display device 202 on the calibration device 1014A. While FIG. 10 illustrates the reflection 1000B of the display device 202 being captured by camera 1010 and being displayed on the display device 202, displaying the image captured by the camera 1010 on the display device 202 is not required for the practice of the current embodiment. Indeed, display device 202 could be displaying a fixed pattern, or even be turned off during the calibration of the various 3D imaging systems as disclosed herein. FIG. 11 illustrates a top plan view of a calibration system 1100 including the movable camera 1110 in a position relative to the display device 1100A and the calibration device 1114A. Note that the path 1122 of the display device image being reflected by the calibration device 1114A is illustrated in FIG. 10. Directing viewing of the display device 1100A by the camera 1110, as depicted in path 1120, however, is not required to practice the current embodiment.

Figure 12:
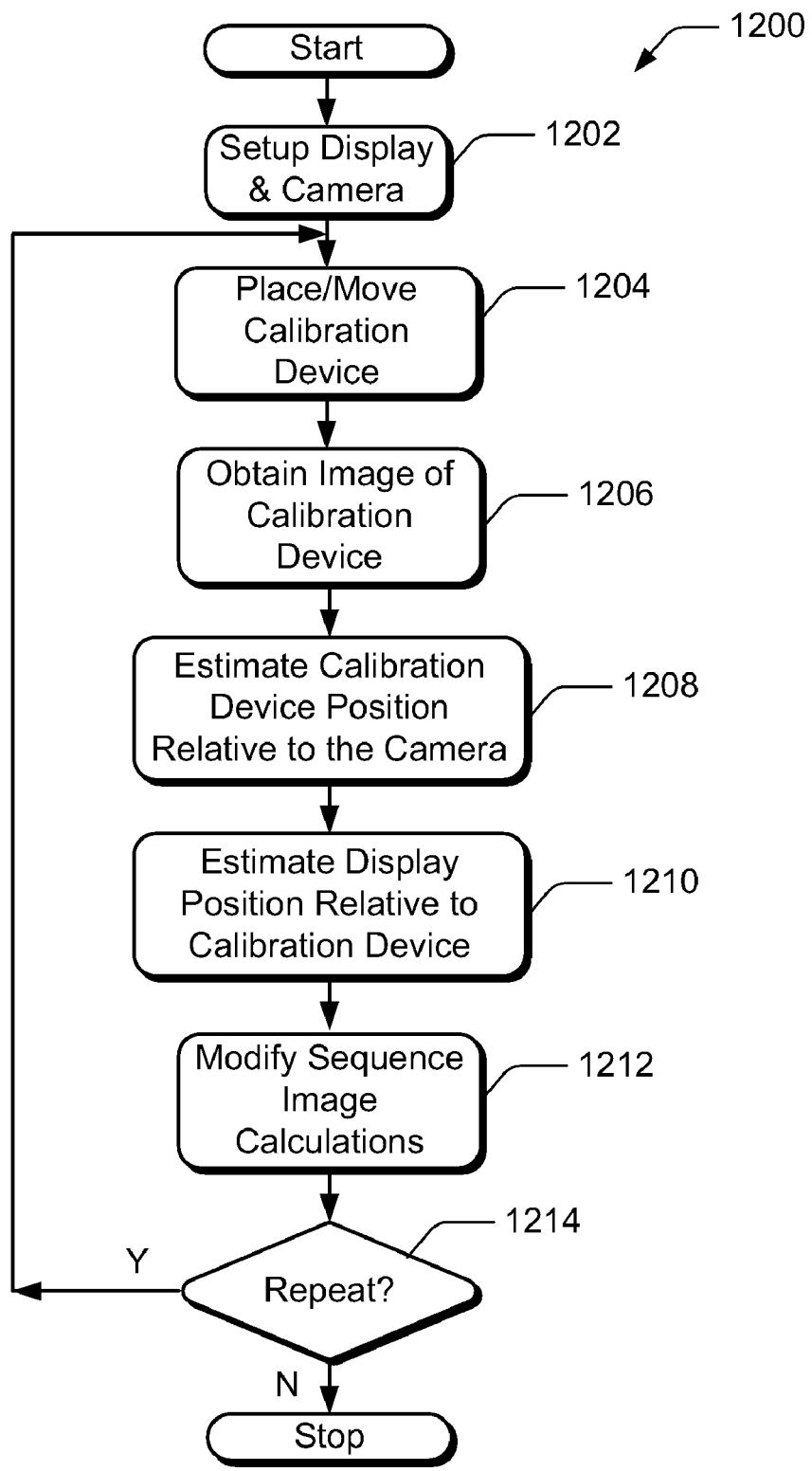
FIG. 12 is a flow diagram that illustrates a method associated with the calibration system shown in FIGS. 10 and 11.

With reference now to FIG. 12, a flowchart illustrating an embodiment of a method of calibrating a 3D imaging system is illustrated. The method 1200 includes setting up the video camera 1010 and display device 1002 in their desired positions. See step 1202. Often, the video camera 1010 is near the display device 1002 and pointed toward the area in front of the display device 1002. However, other relative positions and orientations of these components 1002 and 1010 are possible and within the scope of this disclosure.

At step 1204 the calibration device 1014 is placed in the field of view of the video camera 1010. The calibration device 1014 can be any object which the video camera 1010 can obtain images of to determine the position and orientation of the calibration device 1014 relative to the video camera 1010. In addition, the calibration device 1014 can be any object which also allows the position of the display device 1002 relative to the calibration device 1014 to be determined. For instance, the calibration device 1014 could be an ultrasonic transducer configured to transmit (or receive) ultrasonic signals to (or from) a corresponding transducer on the display device 1002. In which case, supporting logic within the calibration system 1000 would be used to determine the position of the display device 1002 relative to the calibration device 1014.

In one embodiment, however, the calibration device 1014 includes a reflective surface (e.g. a mirror) and a patterned border surrounding the reflective surface. The pattern of the border is selected so that machine vision logic within the calibration system 1000 can distinguish the calibration device 1014 from its surroundings. Accordingly, the particular pattern of this embodiment is a pattern which includes highly contrasting portions (e.g. striped patterns, checkered patterns, etc.).

In the method 1200, the calibration device 1014 is placed in the field of vision of the video camera 1010 at such a position that the patterned border and reflective surface are visible to the video camera 1010. Furthermore, the calibration device 1014 is orientated at that position so that a reflection of the display device 1002 (on the reflective surface) is also visible to the video camera 1010. Thus, at step 1206 an image of the calibration device 1014 and the reflection of the display device on the calibration device 1014 is obtained. As a result, supporting logic within the calibration system 1000 determines (from the image of the calibration device 1014) the position and orientation of the calibration device 1014 relative to the video camera 1010. See step 1208. The supporting logic also determines (from that relative position, from that orientation, and from the reflection of the display device 1002 on the reflective surface) the position of the display device 1002 relative to the calibration device 1014. See step 1210.

Given the relative positions of the display device 1002, the video camera 1010, and the calibration device 1014, the supporting logic in the calibration system 1000 determines any modifications which might be desirable to calibrate the 3D imaging system to operate with a viewer's eye at the position of the calibration device 1014. More particularly, the calculations underlying the generation of the sequential image 606 (including the motion parallax depiction) are modified to render the sequential image 606 as seen by a viewer from a position relative to the scene which corresponds to the position of the calibration device 1014 relative to the display device 602. See step 1212.

Step 1214 illustrates that the foregoing method 1200 can be repeated to calibrate the 3D imaging system when the video camera 1010 moves or is replaced. In addition, step 1214 illustrates that the foregoing method 1200 can be repeated with the calibration device 1014 at various locations relative to the display device 1002 to map the volume of space in front of the display device 1002 for rendering the sequential image 606 for a viewer moving within that volume of space.

Figure 13:
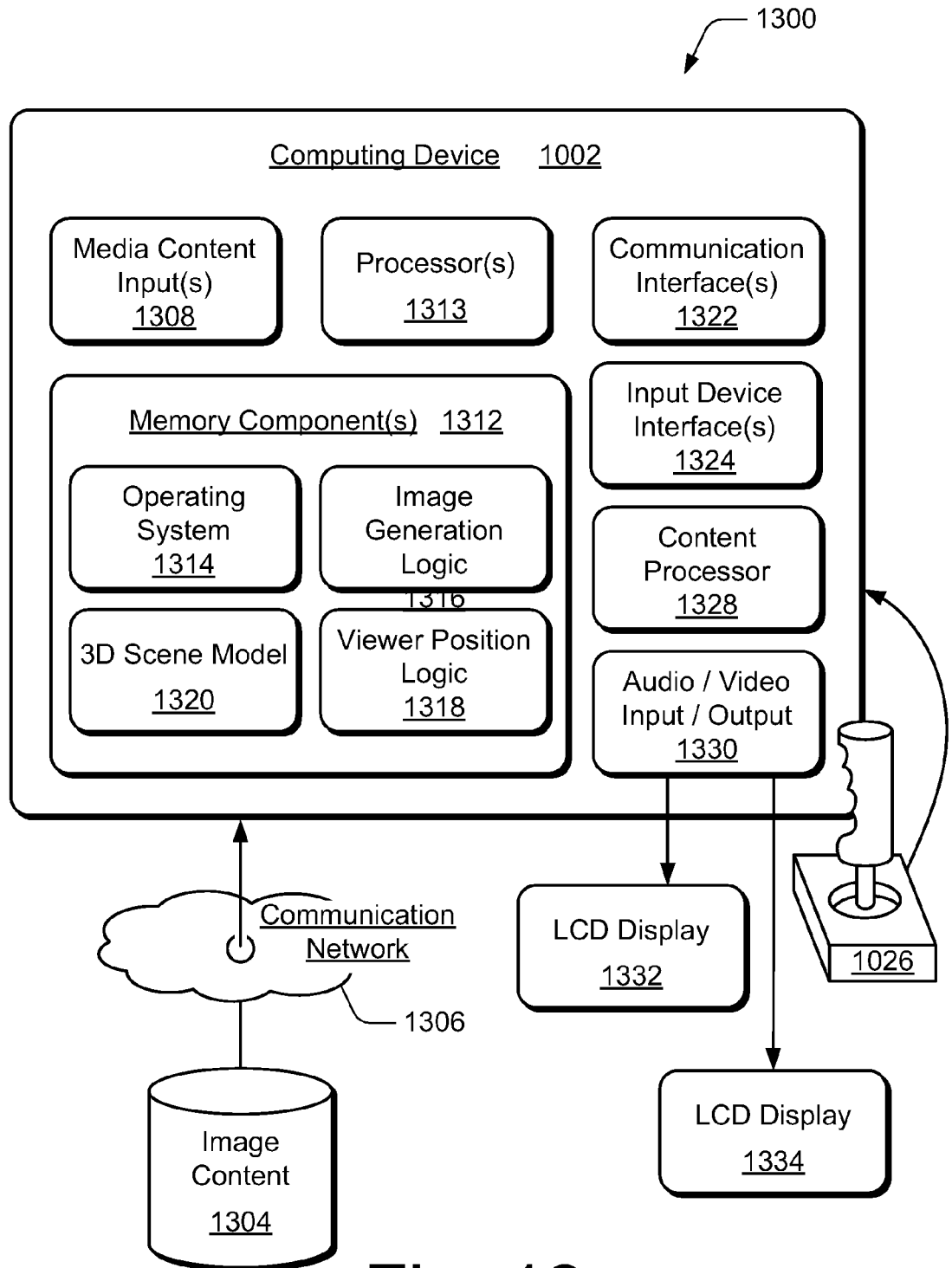
FIG. 13 is a schematic diagram of an embodiment of a motion motion-parallax -3D-imaging system.

FIG. 13 illustrates various components of an exemplary computing system 1300 that can be implemented in a motion-parallax-3D-imaging system, such as in the motion-parallax-3D-imaging systems 600 and 700 described with reference to FIGS. 6 and 7, respectively. The computing system 1300 includes a computing device 1302 which can be implemented in any number of embodiments with numerous other general purpose or special purpose computing system environments or configurations. Examples of well known computing systems, environments, and/or configurations that may be implemented in the exemplary computing system 1300 include, but are not limited to, personal computers, hand-held or laptop devices, multiprocessor systems, microprocessor-based systems, set-top boxes, programmable consumer electronics, network PCs, gaming consoles, distributed computing environments that include any of the above systems or devices, and the like.

Computing system 1300 includes remote image content 1304 which can be received via a communication network 1306. The image content 1304 is stored for display as sequential image 606 on the display device 602 (FIG. 6), and for display as sequential image on the display 712 (FIG. 7). The image content 1304 can include any combination of video, still images, and interpolated synthetic images captured and/or generated to form dynamic scenes for display as a sequential image including motion parallax depictions.

In the examples of motion-parallax-3D-imaging systems disclosed with reference to the motion-parallax-3D-imaging systems 600 and 700, the image content 1304 is pre-rendered as video based on the current eye location or head position of a viewer and changes to correspond to positional changes of the viewer. Although the computing device 1302 and the image content 1304 are illustrated and described as separate and/or remote components of the computing system 1300, the computing device 1302 may contain the image content 1304 in an integrated memory component.

Communication network 1306 can be implemented as any data communication medium, Internet protocol (IP) connection, or communication system having any protocol and/or messaging format. For example, the communication network 1306 can be implemented as a local area network (LAN), a wide area network (WAN), a public network such as the Internet, and/or any combination thereof. Although not shown, communication between devices in the computing system 1300 can also be facilitated via a cable network, radio frequency signal, over-air broadcast, satellite transmission, and the like.

The computing device 1302 includes one or more media content inputs 1308 which may include Internet Protocol (IP) inputs over which streams of media content (e.g., image content 1304) are received via an IP-based network (e.g., communication network 1306). The computing device 1302 also includes one or more processors 1310 (e.g., any of microprocessors, controllers, and the like) which process various instructions to control the operation of computing device 1302 and to communicate with other electronic and computing devices.

The computing device 1302 can be implemented with one or more memory components 1312, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. The memory components 1312 provide data storage mechanisms to store various information and/or data such as received media content, software applications, and any other types of information and data related to operational aspects of computing device 1302.

An operating system 1314, image-generation logic 1316, and viewer position logic 1318 can all be maintained as software applications with non-volatile memory components 1312 and executed on processor(s) 1310 to implement embodiments of motion-parallax-3D-imaging systems. As described above with reference to the motion-parallax-3D-imaging systems 600 and 700, the image-generation logic generates a sequential image that corresponds to a positional change of the eyes of a viewer, or a positional change of a viewer's head. The sequential image includes a motion parallax depiction of a current frame of a sequential image relative to a previous frame of the sequential image, and may also include a binocular parallax depiction of the current image. The viewer position logic 1318 initiates centering the images of the scene on the display devices 602 and 712 (FIG. 7) in front of the viewer and relative to the head position of the viewer according to the image-acquisition systems 608 and 702.

Although the image-generation logic 1316 and the viewer position logic 1318 are each illustrated and described as a single application, each can be implemented as several component applications distributed to each perform one or more functions in the exemplary computing system 1300. Further, the image-generation logic 1316 and/or the viewer position logic 1318 may be implemented on a device other than the computing device 1302, where the other device may also be configured for communication with computing device 1302 in the computing system 1300.

As used herein, the term "logic" (e.g., the image-generation logic 1316 and/or the viewer position logic 1318) can also refer to hardware, firmware, software, or any combination thereof that may be implemented to perform the logical operations associated with the embodiments of 3D imaging systems. Logic may also include any supporting circuitry utilized to complete a given task including supportive analog operations. For example, logic may also include analog circuitry, memory components, input/output (I/O) circuitry, interface circuitry, power providing/regulating circuitry, and the like. A 3D-scene model 1320 is also maintained with the non-volatile memory components 1312. As described above with reference to the motion-parallax-3D-imaging system 700, the 3D-scene model 1320 maintains positional information regarding objects in various scenes to be rendered by the motion-parallax-3D-imaging system 700.

The computing device 1302 further includes communication interface(s) 1322 and input device interfaces 1324 which can be implemented as any one or more of a serial and/or parallel interface, a wireless interface, any type of network interface, and as any other type of communication interface. A wireless interface enables computing device 1302 to receive control input commands and other information from an input device, such as from a remote control device or from another infrared (IR), 802.11, Bluetooth, or similar RF input device. An input device interface 1324 provides an interface for a joystick controller 1326 that can be used in conjunction with a viewer positional tracking system to pan, tilt, or zoom within a sequential image (including a motion parallax 3D depiction).

A network interface provides a connection between computing device 1302 and the communication network 1306 by which the other electronic and computing devices. Similarly, a serial and/or parallel interface provides a data communication path directly between computing device 1302 and the other electronic or computing devices. A modem facilitates computing device 1302 communication with the other electronic and computing devices via a conventional telephone line, a DSL connection, cable, and/or other type of connection. Although not shown, computing device 1302 may also include user and other input devices such as a keyboard, mouse, pointing device, and/or other mechanisms to interact with, and to input information to computing device 1302.

Computing device 1302 also includes a content processor 1328 which can include a video decoder and/or additional processors to receive, process, and decode media content, image content, and display data. Computing device 1302 also includes audio and/or video input/outputs 1330 that provides audio and/or video to an audio rendering and/or display devices 1332 and 1334, or to other devices that process, display, and/or otherwise render audio, video, and display data. Video signals and audio signals can be communicated from computing device 1302 to the display devices 1332 and 1334 via an RF (radio frequency) link, S-video link, composite video link, component video link, analog audio connection, or other similar communication links.

Although shown separately, some of the components of computing device 1302 may be implemented in an application specific integrated circuit (ASIC). Additionally, a system bus (not shown) typically connects the various components within computing device 1302. A system bus can be implemented as one or more of any of several types of bus structures, including a memory bus or memory controller, a peripheral bus, an accelerated graphics port, or a local bus using any of a variety of bus architectures.

Although embodiments of 3D imaging systems and methods have been disclosed in language specific to structural features and/or methods, it is to be understood that the subject of the appended claims is not necessarily limited to the specific features or methods described. Rather, the specific features and methods are disclosed as non limiting implementations of 3D imaging systems and methods.

The invention claimed is:

1. An imaging system comprising:
   an image-acquisition system configured to determine a location of an eye of a viewer from an image obtained by the image-acquisition system, the image-acquisition system further configured to track a positional change of the eye of the viewer;
   a two-dimensional display system configured to display a sequential image for viewing with the eye of the viewer, the positional change of the eye of the viewer to be relative to the display system;
   a memory configured to store a model of a scene; and
   an image-generation logic configured to generate the sequential image, the sequential image including motion parallax depiction of the scene determined from the model and the positional change of the eye of the viewer relative to the display;
   wherein the image-acquisition system is further configured to determine a number of faces from the image obtained by the image-acquisition system and the image-generation logic is further configured to at least adjust the generation of the sequential image depending on the number of faces.

2. A system as recited in claim 1 wherein the scene is one of a teleconference, a gaming or a virtual user interaction environment.

3. A system as recited in claim 1, wherein the model of the scene includes plurality of layers associated with a plurality of objects in the scene and wherein the model further includes a plurality of depths corresponding to the plurality of objects.

4. A system as recited in claim 3, wherein the model further includes a framing layer associated with the display system, the sequential image framed in the display system using the framing layer.

5. A system as recited in claim 1 further comprising a calibration device, the image-generation logic being further configured to determine a position of the calibration device relative to the image-acquisition system and the position of the calibration device relative to the display system to determine the position of the display system relative to the image acquisition system.

6. A system as recited in claim 5, wherein the calibration device includes a mirror and wherein the determination of the position of the display system relative to the calibration device is based on a reflection of the display system in the mirror.

7. A system as recited in claim 6, wherein the calibration device includes a patterned region for determining the position of the calibration device with respect to the image acquisition system.

8. A system as recited in claim 1, wherein the image-acquisition system includes a depth camera.

9. A system as recited in claim 1, wherein the image-acquisition system is further configured to predict the positional change of the eye of the viewer and wherein the image-generation logic is further configured to determine the motion parallax depiction of the scene from the model and the predicted positional change of the eye of the viewer.

10. A system as recited in claim 1, wherein the image-generation logic is configured to at least adjust the generation of the sequential image depending on the number of faces by at least pausing the generation of the sequential image.

11. A system as recited in claim 1, wherein the image-acquisition system is further configured to determine a positional difference between a pair of eyes of the viewer, the sequential image including a binocular parallax depiction of the scene determined from the positional difference between the pair of eyes of the viewer.

12. A system as recited in claim 1, wherein at least a portion of the image-acquisition system is movable relative to the display system.

13. A method comprising:
   building a model of a scene in an imaging system;
   determining a location of an eye of a viewer relative to a display system using an image obtained by an image-acquisition system;
   tracking a positional change of the eye of the viewer relative to the display system using the image-acquisition system;
   determining, using a image-generation logic, a motion parallax depiction of the scene from the model of the scene and from the positional change of the eye of the viewer relative to the display system;
   generating a sequential image including the motion parallax depiction of the scene using the image-generation logic; and
   displaying a two-dimensional version of the sequential image for viewing with the eye of the viewer using the display system;
   wherein the image system further comprising a calibration device; and
   the method further comprises:
   using the image-generation logic to determine a position of the calibration device relative to the image-acquisition system and the position of the calibration device relative to the display system to determine the position of the display system relative to the image acquisition system.

14. A method as recited in claim 13, wherein the model of the scene includes a plurality of layers associated with a plurality of objects in the scene and wherein the model further includes a plurality of depths corresponding to the plurality of objects.

15. A method as recited in claim 14, wherein the model further includes a framing layer associated with the display system, the method further comprising framing the sequential image in the display system using the framing layer.

16. A method as recited in claim 13, wherein the calibration device includes a mirror and wherein the determination of the position of the display system relative to the calibration device is based on a reflection of the display system in the mirror.

17. A method as recited in claim 16, wherein the calibration device includes a patterned region for determining the position of the calibration device with respect to the image acquisition system.

18. A method as recited in claim 13, wherein at least a portion of the image-acquisition system is movable relative to the display system.

19. A computer readable device including executable instructions stored thereon which when executed cause a computer to execute an imaging method comprising:

determining a position of a calibration device relative to an image-acquisition system;

determining a position of a display system relative to the calibration device;

determining a location of an eye of a viewer relative to the display system using the image-acquisition system;

tracking a positional change of the eye of the user relative to the display system using the image-acquisition system;

determining a motion parallax depiction of a scene using a model of the scene and using the positional change of the eye of the viewer relative to the display system;

generating a sequential image including the motion parallax depiction of the scene; and displaying a two-dimensional version of the sequential image for viewing with the eye of the viewer using the display system;

determining a number of faces from an image obtained by the image-acquisition system and at least adjusting the generating of the sequential image depending on the number of faces.

\* \* \* \* \*